United States Patent

[11] 3,608,754

| [72] | Inventor | Wallace Sidney Park<br>c/o Park Aerial Surveys, Inc. P. O. Box 21379, Louisville, Ky. 40221 |
|---|---|---|
| [21] | Appl. No. | 28,371 |
| [22] | Filed | Apr. 14, 1970 |
| [45] | Patented | Sept. 28, 1971 |

[54] LAUNCHING AND RECOVERY GUIDE
9 Claims, 6 Drawing Figs.

[52] U.S. Cl. ..................................... 214/84,
9/1 T, 61/67, 280/414
[51] Int. Cl. ..................................... B60p 1/52
[50] Field of Search .......................... 214/505,
506; 280/414; 9/1 T; 61/65, 67

[56] References Cited
UNITED STATES PATENTS
| 2,371,461 | 3/1945 | Newell ......................... | 9/1 T |
| 3,119,127 | 1/1964 | Taggert ........................ | 9/1 T |

*Primary Examiner*—Albert J. Makay
*Attorney*—Birch and Birch

ABSTRACT: A launching and recovery guide for a boat trailer comprises a floatable concave member hingedly connected to the trailer for movement between a normally retracted position below the rear bolsters of the trailer to protracted positions above the bolsters. The concave member is adapted to contact the bottom of the hull of the boat as it is being launched from the trailer or recovered and retain it in a longitudinal position against the forces of tide, water currents and wind until the launching or recovery is completed.

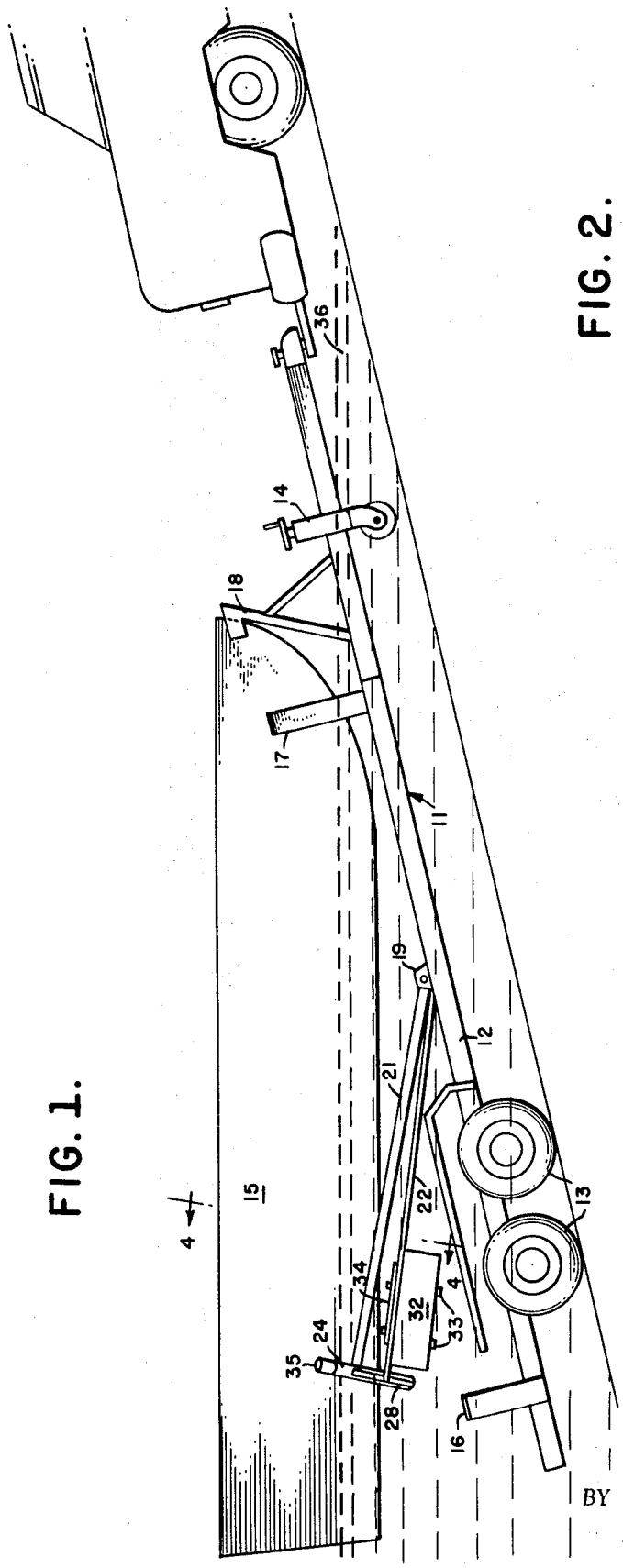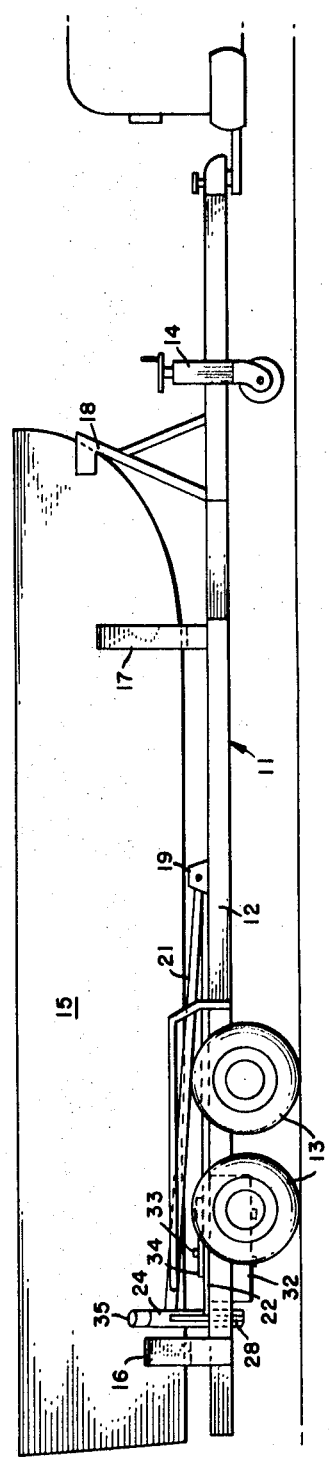

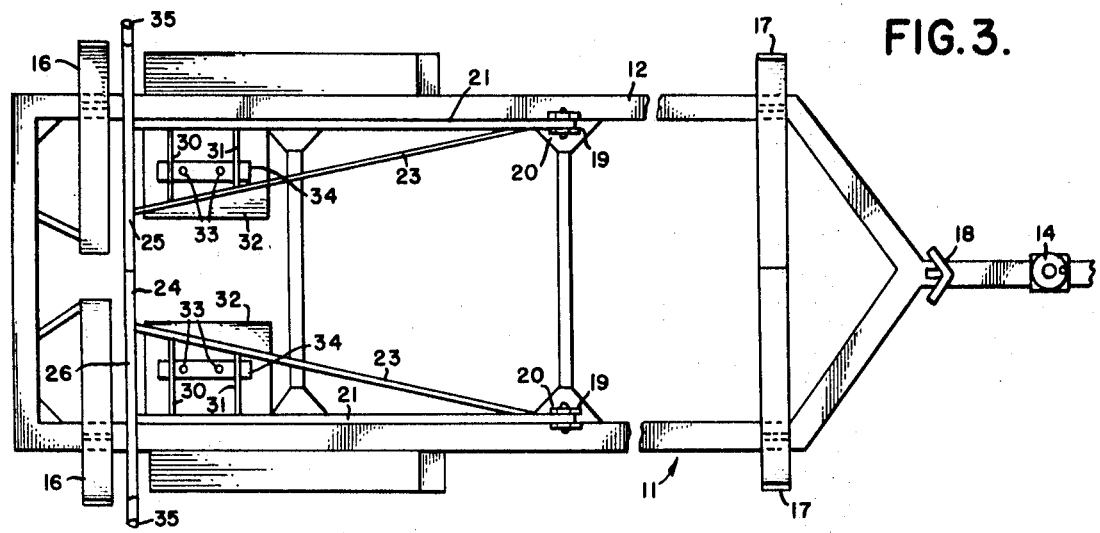
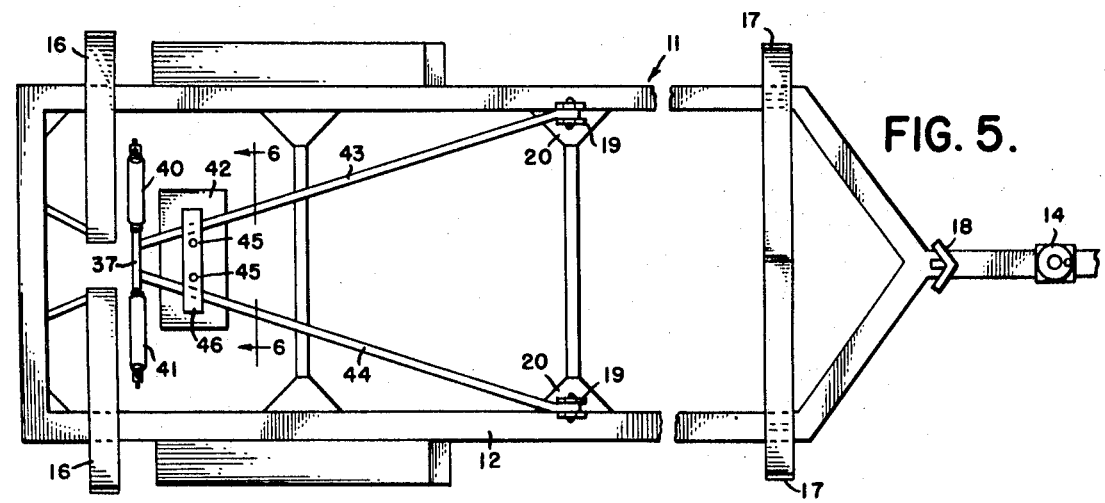
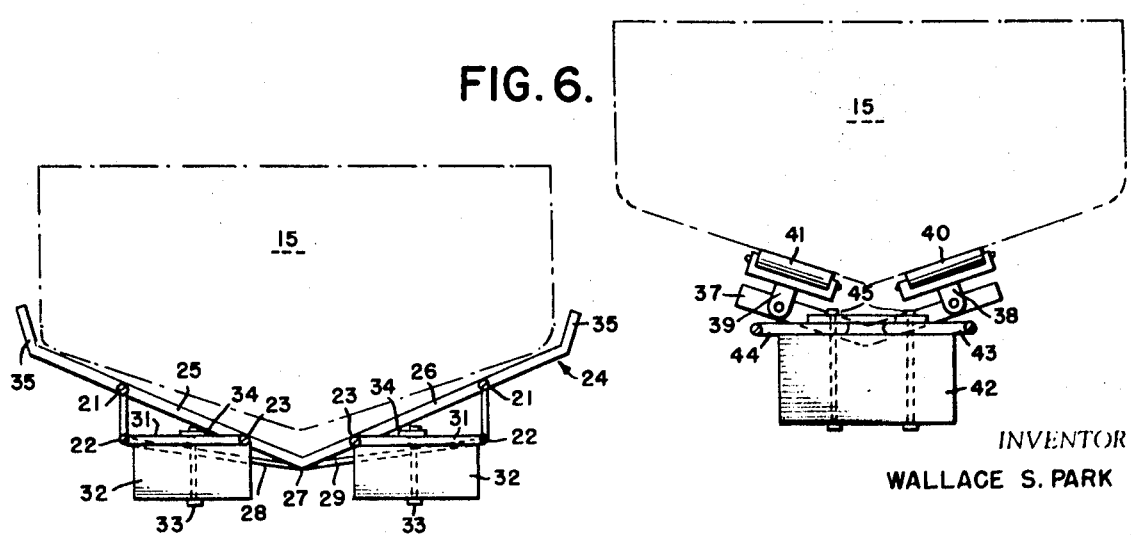

LAUNCHING AND RECOVERY GUIDE

This invention relates to boat trailers and it is more particularly concerned with a boat trailer having means for guiding a boat while being launched or recovered.

Boat trailers of the prior art lack adequate means for guiding a boat during launching and recovery. Boats while being launched or recovered are subjected to lateral displacement by the forces of wind, tide and water currents. The present invention is adapted to resist these forces and thereby maintain the boat in substantial longitudinal alignment with the trailer until the launching or recovery is completed.

An object of the invention is the provision of a boat trailer guide which is effective at a range of levels of the body of water into which the boat is to be launched or from which it is being recovered.

Another object of the invention is the provision of a boat launching and recovery guide which can be attached to a conventional type of boat trailer.

A further object of the invention is the provision of a boat launching and recovery guide which is relatively simple in construction and operation and which in fact functions automatically.

A still further object of the invention is the provision of a boat launching and recovery guide which does not interfere with the normal use of the boat trailer to which it is connected.

These and still further objects, advantages and features of the invention will appear more fully from the following description considered together with the accompanying drawing. In the drawing:

FIG. 1 is a longitudinal elevational view of an embodiment of the invention in protracted position in relation to a boat being launched from a boat trailer.

FIG. 2 is a view similar to FIG. 1 with the embodiment in its normally retracted position on the trailer for land transportation.

FIG. 3 is a top plan view of the embodiment with the boat removed.

FIG. 4 is a cross-sectional view along the line 4—4 of FIG. 1, the boat being shown in broken lines.

FIG. 5 is a view similar to FIG. 3 of a modified embodiment of the invention.

FIG. 6 is a cross-sectional view along the line 6—6 of FIG. 5, the boat being shown in broken lines.

Referring to the drawing with more particularity, the embodiment illustrated in FIG. 1 to 4 comprises a conventional boat trailer 11 having a conventional type of chassis 12 mounted on rear wheels 13 and a vertically adjustable front caster 14. A boat 15 is adapted to be supported on the chassis by means of rear bolsters 16, 16 and front bolsters 17, 17. The front bolsters are lower than the rear bolsters so as to orient the boat in a longitudinal angular position toward a retaining abutment 18 which is secured to the chassis in front of the bolsters 17, 17 to contact the front of the boat and limit it from longitudinal displacement forwardly.

In accordance with this embodiment of the invention a pair of longitudinal arms are pivoted at their rear ends to vertical flanges 19, 19 fixed to medial parts 20,20, respectively, of the chassis.

The longitudinal arms each comprise a group of three longitudinal members 21, 22 and 23, each group forming a triangular pyramid with its apex at the pivoted end.

To the rear end of the pivoted longitudinal arms there is secured a concave member 24 in the form of an obtuse angle the sides 25 and 26 being welded or otherwise secured to the outer ends of the members 21 and 23. The lower end 27 of the member 24 is braced to the lower members 22 by struts 28 and 29.

The length of the members 21, 22 and 23 are such that the member 24 in its normally retracted position (see FIG. 2) is below the level of the rear bolsters 16.

Bracing struts 30 and 31 are provided between the members 22 and 23. These struts also serve as supports for blocks 32 of a foamed plastic material such as foamed polystyrene resin. The blocks 32 are held on the struts by means of suspension bolts 33 passing through the blocks and a cleat 34 of metal, wood or other suitable material overlying the struts.

The outer ends of the concave member 24 are provided with vertical tips 35, 35.

By these means as the trailer is moved into a body of water 36 for launching, the flotation blocks 32 urge the concave members 24 upwardly against the hull of the floating boat 15 while the trailer 11 sinks in the water, thereby acting as a guide to maintain the boat in a longitudinally oriented position against the force of wind, water and tide until the boat is free of the trailer. When it is desired to recover the boat from the body of water, the concave member 24 defines the position of the trailer below the water and thereby serves as a guide for positioning the boat.

The modified embodiment illustrated in FIGS. 5 and 6 differs from the embodiment described above in the provision of a relatively short concave member 37 instead of the member 24. Vertical rocker arms 38 and 39 are pivoted to either side of the concave member 37. The upper ends of the rocker arms are provided with roller bearings 40 and 41 for contacting the hull of the boat 15. A flotation block 42 similar to the blocks 34 is attached to the pivoted arms 43 and 44 to which the concave member 37 is attached by similar suspension bolts 45 and a cleat 46.

This provides an automatically adjustable antifriction means between the concave member 37 and the boat 45 to facilitate movement of the boat relative to the member.

I claim:

1. The combination of a boat trailer including a frame and front and rear bolsters for supporting a boat, a floatable guide member carried by the trailer for movement between a normally nonfloating retracted position below the bolsters and a floating position above the bolsters, said guide member conforming generally to portions of the bottom of the hull of the boat to be carried by the trailer, the floatable member comprising a transverse concave member vertically movable in a path adjacent to the rear bolster, a pair of arms pivotally hinged forwardly of the trailer to each side of the frame and diverging rearwardly intermediate the frame where they are secured to the concave member, and flotation means secured to the arms.

2. The combination as defined by claim 1 in which the flotation means comprises a block of foamed plastic material.

3. The combination as defined by claim 2 in which the plastic material is polystyrene resin.

4. The combination as defined by claim 1 in which the outer ends of the concave member have vertical tips.

5. The combination as defined by claim 1 in which the concave member is in the general shape of an obtuse angle.

6. The combination as defined by claim 1 and antifriction means carried by the guide member for contacting the hull of the boat.

7. The combination as defined by claim 6 in which the antifriction means comprises roller bearings.

8. The combination as defined by claim 7 in which the roller bearings are moved on rocker arms, said rocker arms being pivotally connected to the guide member.

9. The combination as defined by claim 1 and vertical posts secured to and extending upwardly from the guide member, rocker arms pivotally connected to the upper ends of the vertical posts and rollers rotatably mounted on said rocker arm.